US006193138B1

(12) United States Patent
Wada

(10) Patent No.: US 6,193,138 B1
(45) Date of Patent: Feb. 27, 2001

(54) PRESSURE WELDING DEVICE AND METHOD FOR TERMINALS

(75) Inventor: Yoshimi Wada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/146,141

(22) Filed: Sep. 3, 1998

(30) Foreign Application Priority Data

Sep. 5, 1997 (JP) .................................................. 9-240830

(51) Int. Cl.[7] .......................... B23K 20/00; B23K 20/12; B23P 19/00; H01R 43/042

(52) U.S. Cl. .............................. 228/115; 228/3.1; 29/753

(58) Field of Search ................................ 228/115, 173.5, 228/3.1; 29/753

(56) References Cited

U.S. PATENT DOCUMENTS

| | | | | |
|---|---|---|---|---|
| 2,878,854 | * | 3/1959 | Batcheller | 153/1 |
| 3,336,655 | * | 8/1967 | Rozmus | 29/470.1 |
| 3,969,806 | * | 7/1976 | McCaughey | 29/203 DS |
| 4,048,839 | * | 9/1977 | Peterpaul | 72/412 |
| 4,480,385 | * | 11/1984 | Dragisic | 29/866 |
| 4,991,289 | * | 2/1991 | French | 29/863 |
| 5,107,588 | * | 4/1992 | Undin et al. | 29/885 |
| 5,390,410 | * | 2/1995 | Takenami et al. | 29/753 |
| 5,414,926 | * | 5/1995 | Ito et al. | 29/753 |
| 5,415,562 | * | 5/1995 | Matsumoto et al. | 439/397 |
| 5,484,961 | * | 1/1996 | Itoh et al. | 174/84 |
| 5,500,999 | * | 3/1996 | Yagi et al. | 29/753 |
| 5,581,879 | * | 12/1996 | Tsuji et al. | 29/861 |
| 5,619,792 | * | 4/1997 | Ohmori et al. | 29/863 |
| 5,669,257 | * | 9/1997 | Inoue et al. | 72/20.1 |
| 5,774,977 | * | 7/1998 | Folk et al. | 29/753 |
| 5,774,981 | * | 7/1998 | Maejima et al. | 29/861 |

FOREIGN PATENT DOCUMENTS

| | | |
|---|---|---|
| 0592253A2 | 4/1994 | (JP) . |
| 7-14658 | 1/1995 | (JP) . |
| 7-050190 | 2/1995 | (JP) . |
| 7-050191 | 2/1995 | (JP) . |

* cited by examiner

*Primary Examiner*—Patrick Ryan
*Assistant Examiner*—L. Edmondson
(74) *Attorney, Agent, or Firm*—Armstrong, Westerman, Hattori, McLeland & Naughton

(57) ABSTRACT

A terminal pressure welding device and method are provided. In this improved device and method, a pair of wires are pushed into a space between a pair of barrels by a wire holding member, and the pair of barrels are caulked by lapping one of them on the other by a crimper. At the start of the barrel caulking by the crimper, the wires are fixed to a position between the pair of the barrels by the wire holding member 16, so that an ingress allowance space is ensured for allowing the edge of one of the barrels to get under the other barrel. With this device and method, a terminal can be pressure welded onto even two thick wires as desired, and the pressure welding widths of terminals can be as uniform as possible so that the terminals can surely be inserted into the terminal receiving chambers of a connector.

5 Claims, 9 Drawing Sheets

PRESSURE WELDING DEVICE AND METHOD FOR TERMINALS

BACKGROUND OF THE INVENTION

1. Field of the Invention

The present invention relates to a terminal pressure welding device and a method for pressure welding a terminal onto electric wires. This improved pressure welding device can pressure weld a terminal simultaneously onto two thick wires as desired, and make the pressure welding widths of terminals as uniform as possible so that the terminals can surely be inserted into the terminal receiving chambers of a connector.

2. Related Art

FIG. 8 illustrates a conventional connector. A connector housing 1 is provided with a plurality of terminal receiving chambers 2. Each of the terminal receiving chambers 2 accommodates a terminal 4 which is pressure welded onto the edge of a wire 3 and held by a flexible stopper arm (not shown) inside the chamber. However, a terminal 4' pressure welded onto the edges of two wires 3 and 3' (double pressure welding) may be inserted into each terminal receiving chamber 2 in the case of branch connection, and the like.

The terminal 4 comprises an electric contact 4A for a mating terminal (not shown), and a wire pressure welding portion 4B. The wire pressure welding portion 4B is provided with a pair of wire barrels 5 for the conductor 3*a* of the wire 3, and a pair of insulator barrels 6 for an insulating cover layer 3*b*.

The terminal 4' for double pressure welding has substantially the same structure as that of the terminal 4, but a pair of wire barrels 5' and a pair of insulator barrels 6' of a wire pressure welding portion 4B' are made a little longer than the barrels 5 and 6 of each terminal 4 connected to only one wire 3.

The positions of the two wires 3 and 3' to be pushed into the pair of insulator barrels 6' can be categorized roughly into the following four types: (A) a vertical arrangement; (B) a left-inclined arrangement; (C) a right-inclined arrangement; and (D) a horizontal arrangement.

FIG. 10 illustrates a conventional double pressure welding device which comprises a crimper 7, an anvil for placing the terminal 4', and a wire holding member 9. The wire holding member 9 descends right behind the wire pressure welding member 4B' (i.e., in an axially spaced position) to push the pair of wires 3 and 3' into a space between the pair of insulator barrels 6' by the horizontal holding surface 9*a*. After that, the crimper 7 descends to caulk the barrels 6' by covering the wires 3 and 3' with them.

At the bottom of the crimper 7, as shown in FIG. 11, a shallow caulking groove 7*b* is formed on one side of the center (on the left side in the figure) extending from an introducing groove 7*a* which becomes wider at the opening end, while a deep caulking groove 7*c* is asymmetrically formed on the other side (on the right side in the figure). The grooves 7*b* and 7*c* are connected via an inclined surface 7*d*.

When actually performing double pressure welding, the pair of wires 3 and 3' in the vertical arrangement shown in FIG. 9A are placed between the insulator barrels $\mathbf{6}_1$' and $\mathbf{6}_2$', and they remain in the vertical arrangement, since the wire holding member 9 descends vertically. If the diameter of the wires is large, the arranged height of the wires 3 and 3' becomes higher than the edge 6*a*' of the insulator barrel $\mathbf{6}_1$' on the side of the shallow caulking groove 7*b*, as shown in FIG. 11.

If the crimper 7 descends in such condition, the edge 6*a*' of the insulator barrel $\mathbf{6}_1$' cannot be placed below the other insulator barrel $\mathbf{6}_2$', and the edge 6*b*' of the insulator barrel $\mathbf{6}_2$' cannot be interposed between the insulator barrel $\mathbf{6}_1$' and the caulking groove 7*b*. This causes the edges 6*a*' and 6*b*' to collide with each other. As a result, the entire shape becomes somewhat flat, and the insulator barrel $\mathbf{6}_2$' on the right side is buckled in the middle, as shown in FIG. 12. In such pressure welding condition, there is a problem that, since the pressure welding width of the terminal becomes large, the terminal 4' cannot be inserted into the terminal receiving chamber 2 shown in FIG. 8.

Even if the terminal is successfully inserted, the buckled portion will be cracked, and the pressure welding strength is low. When the wires are pulled, the tensile strength will act directly on the wire barrels 5', which might result in cutoff due to vibration.

SUMMARY OF THE INVENTION

The principal object of the present invention is to provide a terminal pressure welding device and method by which even thick wires can be pressure welded as desired, and the pressure welding widths of the terminals can be made as uniform as possible so that the terminals can surely be inserted into the terminal receiving chamber of a connector.

To achieve the above object, a first aspect of the present invention provides a terminal pressure welding method comprising the steps of: pushing wires into a space between a pair of barrels by a wire holding member; restricting the position of the wires between the pair of barrels by the wire holding member, so that an ingress allowance space can be ensured for allowing the edge of one of the barrels to get under the other barrel; and caulking the barrels by overlapping one of the barrels on the other by a crimper, so that the wires can be covered with the barrels.

In accordance with a second aspect of the present invention, the terminal pressure welding device used in the above method is characterized in that a wire-holding inclined surface, which descends from one of the barrels toward the other is provided on the bottom edge of the wire holding member.

In accordance with the first and second aspects of the present invention, the two wires are positioned lower than the edge of the insulator barrels at the time of double pressure welding, so that an ingress allowance space can be ensured for allowing the edge of one of the barrels to get under the other barrel. Accordingly, the edge of one of the barrels gets under the other barrel without the barrels colliding with each other, and the caulking is performed with the barrels overlapping on each other. Thus, flat and buckled pressure welding can be prevented, and all of the terminals can surely be inserted into the terminal-receiving chambers of a connector. The possibilities of cutoff due to a decrease in pressure welding strength can also be eliminated.

A third aspect of the present invention provides a terminal pressure welding device which comprises: a wire holding member for pushing wires into between a pair of barrels; a crimper for caulking the pair of barrels by overlapping one of the barrels on the other barrel, so that the wires can be covered with the barrels; and an asymmetrically reversed V-shaped wire holding groove provided on the bottom edge of the wire holding member and made up of a long wire holding inclined surface which descends from one of the barrels toward the other and a short wire restricting inclined surface which descends in the opposite direction to the wire holding inclined surface.

In accordance with the third aspect of the present invention, by virtue of the reversed V-shaped wire holding groove made up of the long wire-holding inclined surface and the short wire-restricting inclined surface, the positioning of the wires between the barrels can be performed as desired, and wire buckling after pressure welding can be prevented by the stopper function of the wire restricting inclined surface.

In accordance with a fourth aspect of the present invention, the bottom of the wire holding groove made up of the wire-holding inclined surface and the wire-restricting inclined surface serves as a wire-holding portion and is rounded to accommodate the outer surface of the wires. Thus, the coating of the wires can be protected from damage which might be caused by the wire-holding member when it pushes down the wires.

The above and other objects and features of the present invention will be more apparent from the following description taken in conjunction with the accompanying drawings.

DETAILED DESCRIPTION OF THE PREFERRED EMBODIMENTS

Figure 1:
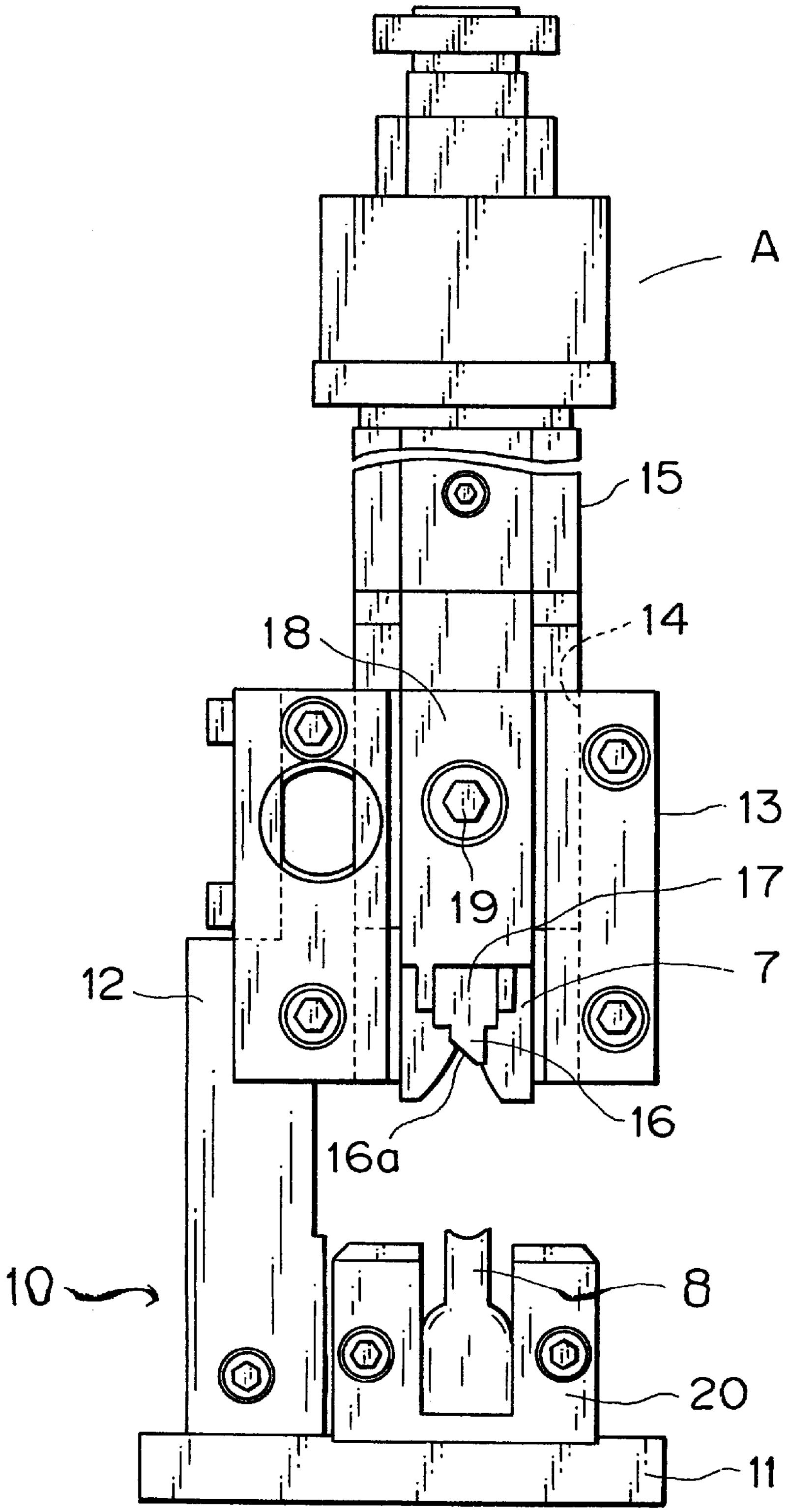
FIG. 1 is a partial front view of one embodiment of the double pressure welding device of the present invention.

The following is a detailed description of embodiments of the present invention, with reference to the accompanying drawings. The same components as in the prior art are denoted with the same reference numerals, and therefore, no explanations for them will be given below.

Figure 2:
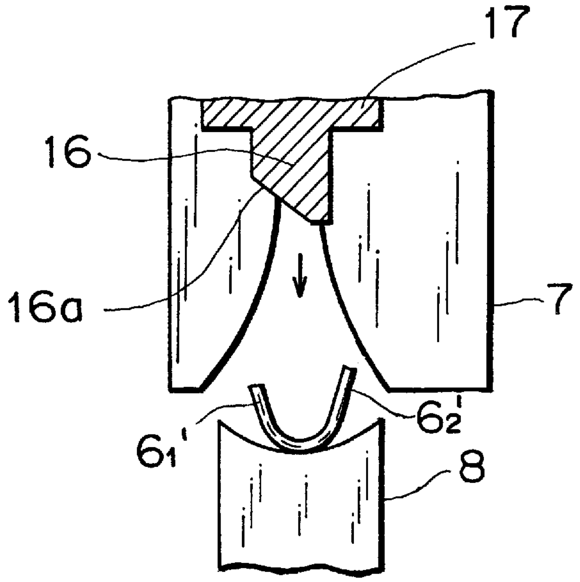
FIG. 2 is an enlarged front view of a portion of the pressure welding device of FIG. 1.

FIG. 1 is a partial front view of a double pressure welding device A in accordance with the present invention, and FIG. 2 is an enlarged front view of the double pressure welding device A. In these drawings, reference numeral 10 indicates the main body of the pressure welding device A, which consists of a substrate 11 and a frame 12 standing from one side of the substrate 11. A ram guide block 13 is secured to the frame 12, and a ram 15 is slidably inserted into a vertical guide groove 14 of the ram guide block 13. The ram 15 ascends and descends by an actuator (not shown) connected thereto. The crimper 7 and the supporting plate 17 of a narrow wire holding member 16 is secured to the front surface of the ram 15 by a bolt 19 via an attachment plate 18. A cushion spring (not shown) is attached to the bottom edge of the attachment plate 17 of the wire holding member 16, so that the wires will not be overloaded. An anvil attachment mount 20 is secured to the substrate 11, and the anvil 8, which faces to the crimper 7, is detachably mounted to the anvil attachment mount 20.

The above structure is the same as that of the pressure welding device of the prior art, except that a wire holding inclined surface 16*a* is provided to the bottom edge of the narrow wire holding member 16. The wire holding inclined surface 16*a* faces to an insulator barrel on the side of the shallow caulking groove 7*b*. More specifically, the wire holding inclined surface 16*a* is a slope descending from the insulator barrel $\mathbf{6}_1$' on the left to the insulator barrel $\mathbf{6}_2$' on the right, as shown in FIG. 2.

Figures 3A, 3B, 3C:
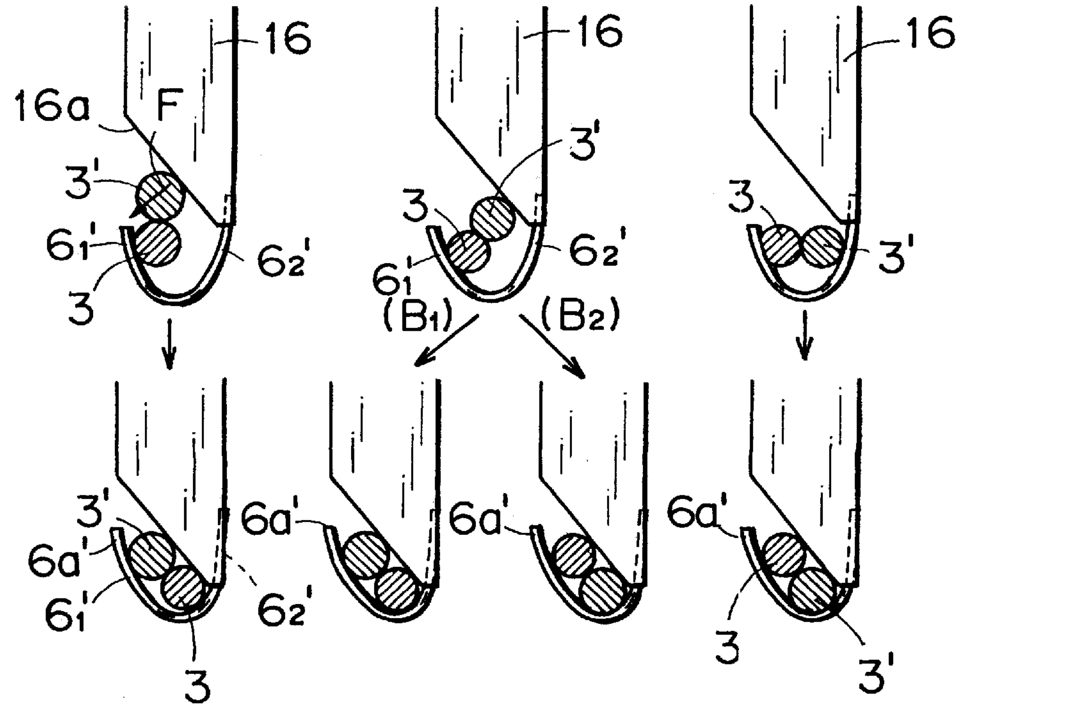
FIGS. 3A to 3C illustrate how the wire holding member of FIG. 1 works with the wires.

FIGS. 3A to 3C illustrate how the wire holding inclined surface 16*a* of the wire holding member 16 works with wires.

Figure 9A:
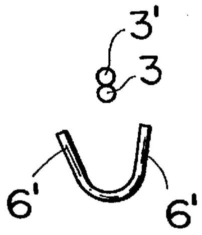
FIG. 9A PRIOR ART
FIGS. 9A to 9D illustrate the arrangements of the wires to be pushed conventionally into a space between the insulator barrels of a terminal.
Figure 9B:
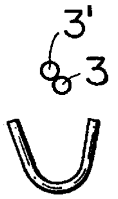
FIG. 9B PRIOR ART

More specifically, the upper half of the FIG. 3A shows the pair of wires 3 and 3' in the vertical arrangement as shown in FIG. 9A. The lower wire 3 already reaches the inclined wall surface of the left-side insulator barrel $\mathbf{6}_1$' and is contact-supported by it. If the wire holding member 16 descends in such situation, force F from the wire holding inclined surface 16*a* towards the insulator barrel $\mathbf{6}_1$' acts on the upper wire 3'. As a result, the upper wire 3' is pushed diagonally downward, and the lower wire 3 is also moved downward. Accordingly, the pair of wires 3 and 3' are interposed between the insulator barrels $\mathbf{6}_1$' and $\mathbf{6}_2$', and the upper wire 3' is situated lower than the edge 6*a*' of the insulator barrel $\mathbf{6}_1$' facing to the wire holding inclined surface 16*a*.

Figure 9C:
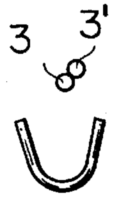
FIG. 9C PRIOR ART

The upper half of the FIG. 3B shows the pair of wires 3 and 3' in the right inclined arrangement as shown in FIG. 9C. In such situation, one of the wires 3 and 3' is situated lower than the edge 6*a*' of the insulator barrel 61', as shown in FIGS. $3B_1$ and $3B_2$.

Figure 9D:
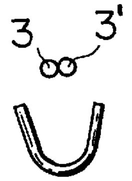
FIG. 9D PRIOR ART
Figure 10:
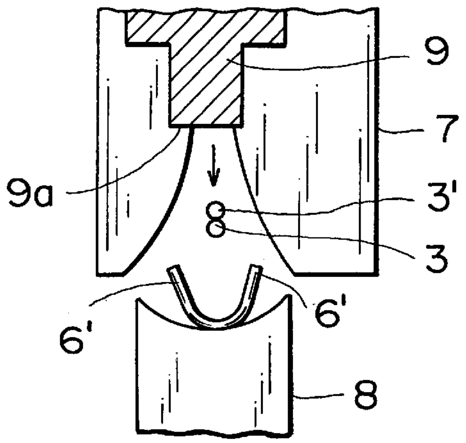
FIG. 10 PRIOR ART
FIG. 10 illustrates a conventional double pressure welding device.
Figure 11:
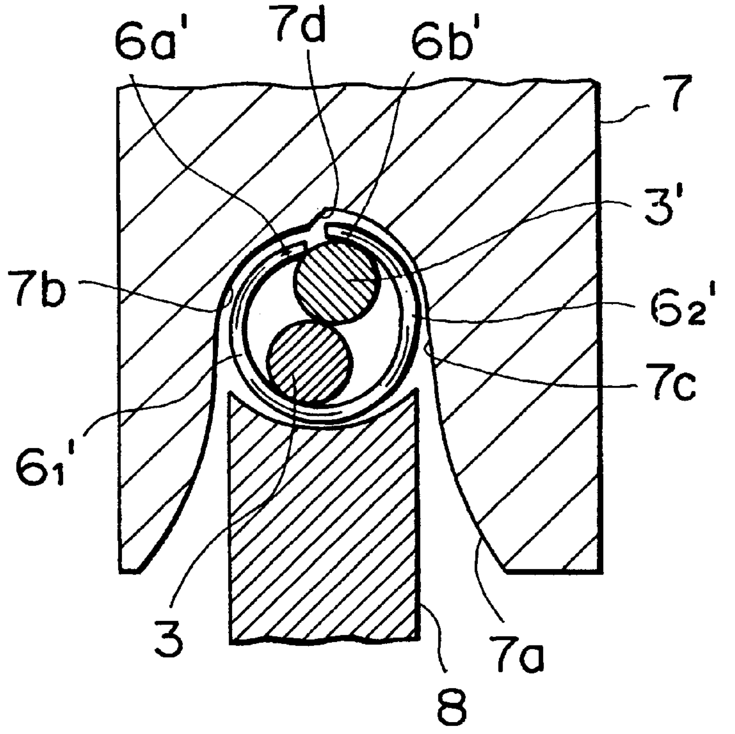
FIG. 11 PRIOR ART
FIG. 11 illustrates double pressure welding by the pressure welding device of FIG. 10.
Figure 12:
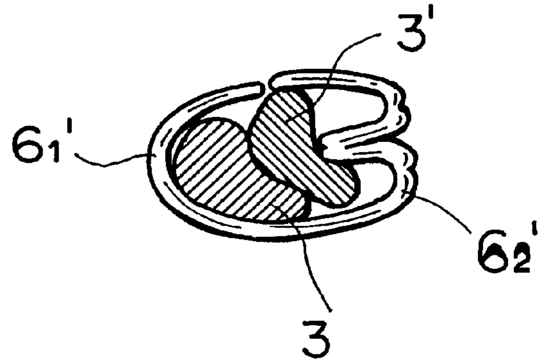
FIG. 12 PRIOR ART
FIG. 12 illustrates buckled double pressure welding.

The upper half of the FIG. 3C shows the wires 3 and 3' in the horizontal arrangement as shown in FIG. 9D. In this situation, the force F acts on the right-side wire 3' and pushes it diagonally downward. As a result, the left-side wire 3 ends up being situated above the wire 3', as shown in the lower half of FIG. 3C, and becomes lower than the edge 6*a*' of the insulator barrel $\mathbf{6}_1$', as shown in FIG. $3B_2$ of FIG. 3B.

As described so far, the double pressure welding device A of the present invention is provided with the wire holding inclined surface 16*a* at the bottom edge of the wire holding member 16.

Figure 4A:
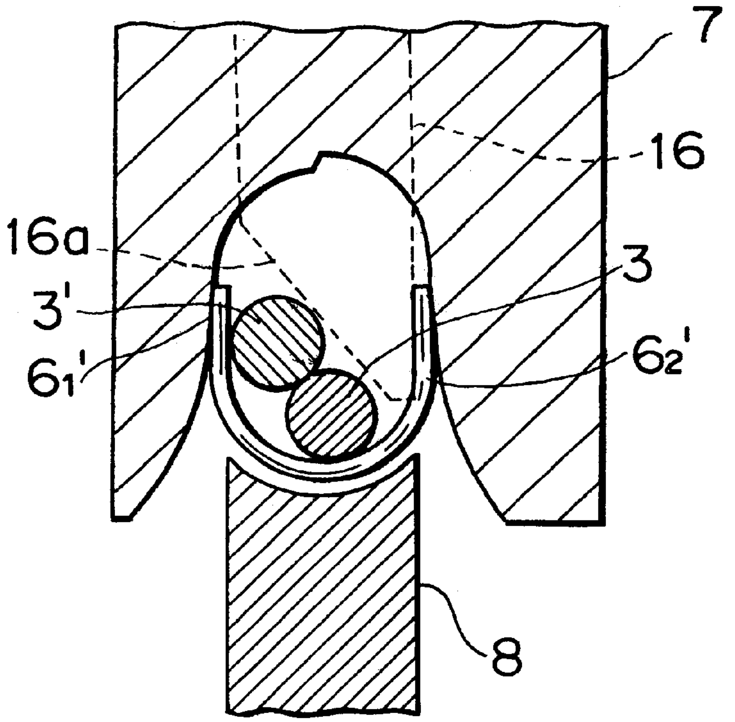
FIG. 4A illustrates the start of pressure welding by the double pressure welding device of FIG. 1.

Accordingly, at the start of double pressure welding of the terminal 4' by the crimper 7, the position of the pair of wires 3 and 3' is always limited to the space between the insulator barrels $\mathbf{6}_1$' and $\mathbf{6}_2$' by the descent of the wire holding member 16, as shown in FIG. 4A. Accordingly, the wire 3 or 3' on the upper side is situated lower than the edge of the insulator barrel $\mathbf{6}_1$'.

Figure 4B:
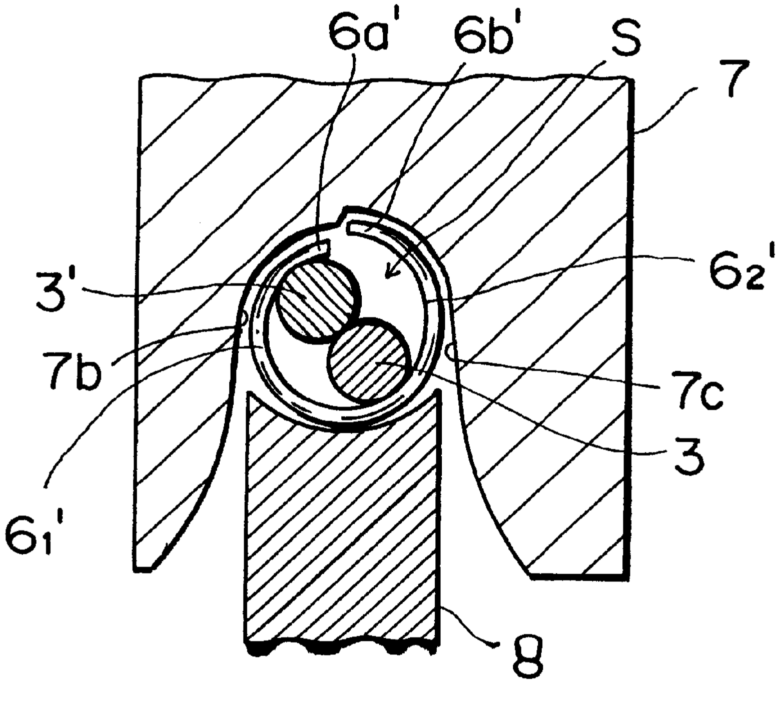
FIG. 4B illustrates the wires, which are pressure welded partway.

As the crimper 7 descends, the edges 6*a*' and 6*b*' of the insulator barrels $\mathbf{6}_1$' and $\mathbf{6}_2$' are rounded by the walls of the shallow caulking groove 7*b* and the deep caulking groove 7*c*, as shown in FIG. 4B, so that an ingress allowance space S for the edge *6a'* of the insulator barrel $6_1$' can be ensured between the wires and the insulator barrel $6_2$'. As a result of the descent of the crimper 7, the edge 6*a'* is situated below the edge 6*b'*, thereby performing caulking as desired.

Figure 5A:
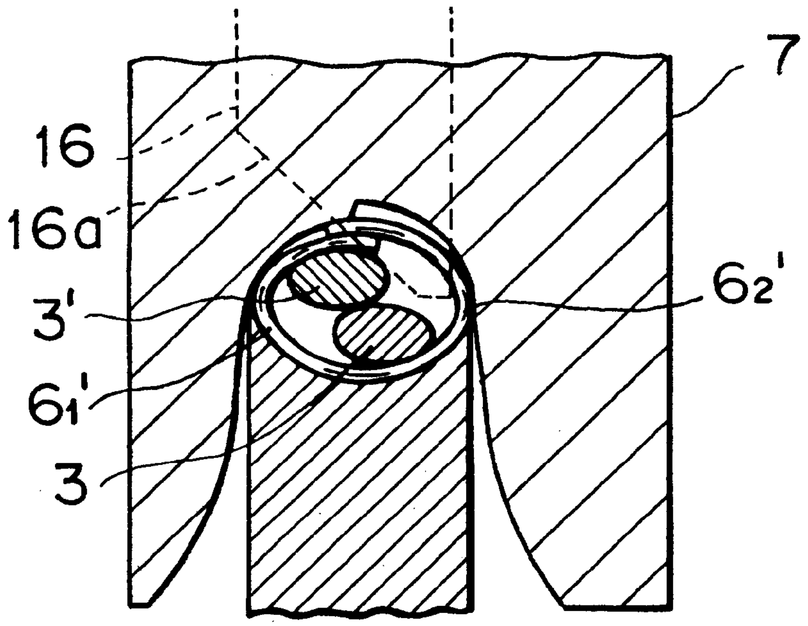
FIG. 5A illustrates the wires after the pressure welding step of FIG. 4B.

In FIG. 5A, the crimper 7 descends further from the position shown in FIG. 4B, so that the insulator barrel $6_2$' is lapped on the insulator barrel $6_1$' to cover and then pressure weld the pair of wires 3 and 3'.

Figure 5B:
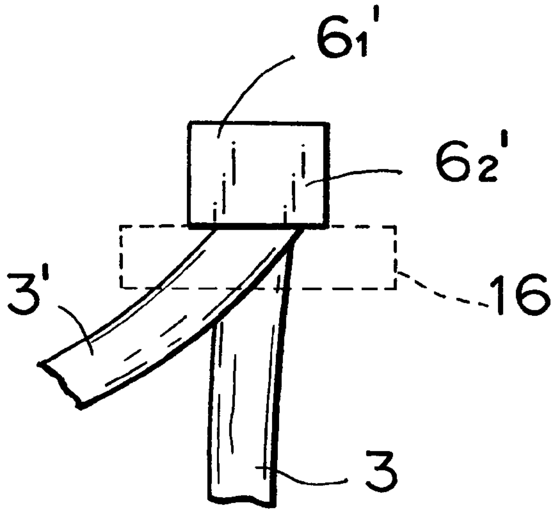
FIG. 5B is a plan view illustrating the connection of the wires of FIG. 5A.

In the pressure welding situation, the wire holding inclined surface 16*a* of the wire holding member 16 still holds the wire 3', and a force which is a little smaller than the force F acts on the wire 3'. Also, there is a deviation in the axial direction between the wire holding member 16 and the pair of insulator barrels $6_1$' and $6_2$', and nothing supports and secures the wires 3 and 3'. As a result, the two-wire pressure welded wire 3' might be bent as shown in FIG. 5B.

Figure 8:
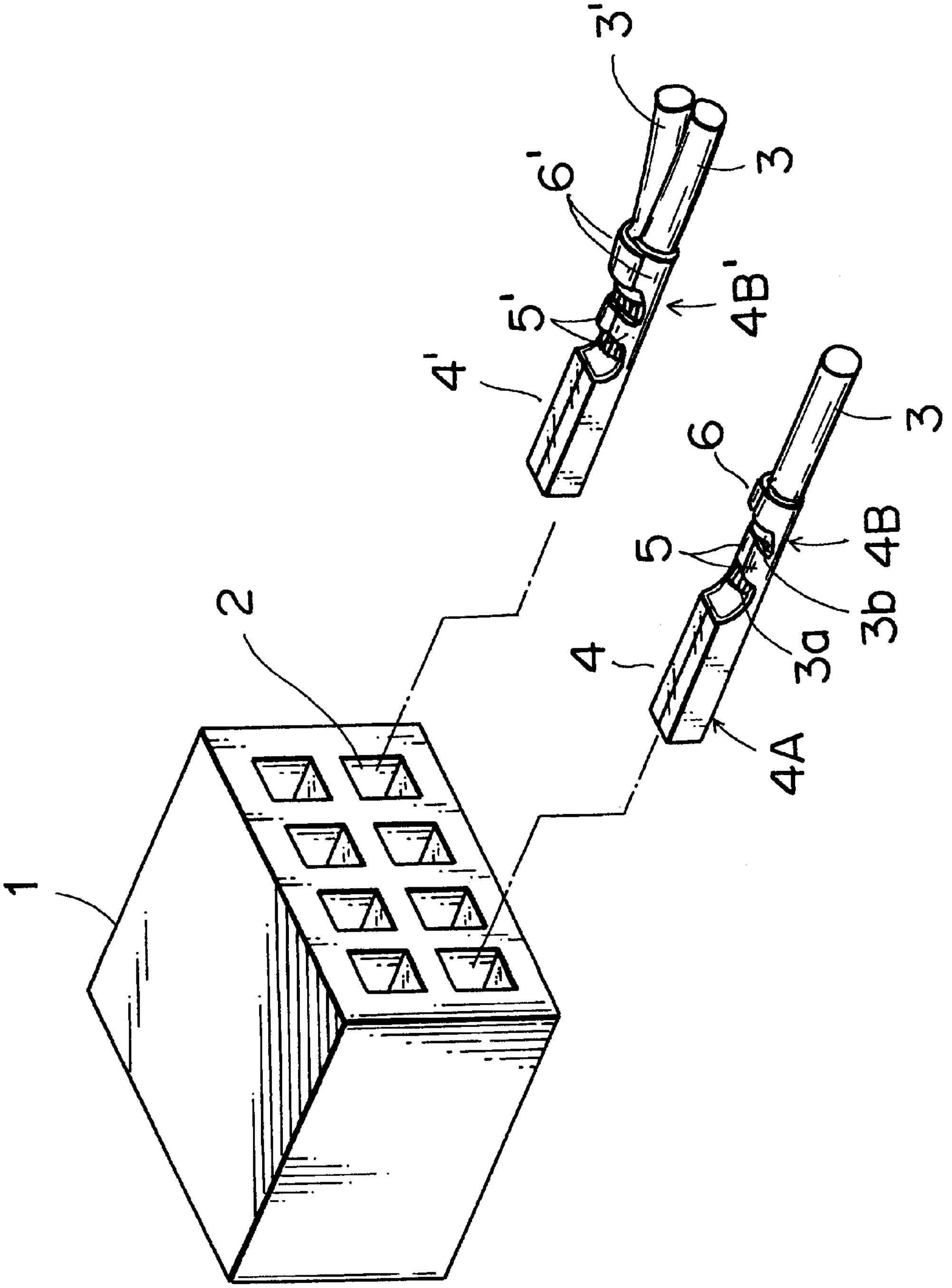
FIG. 8 PRIOR ART
FIG. 8 illustrates a general structure of a conventional connector.

Since a bent wire hinders terminal insertion following the insertion of the terminal 4' into the terminal receiving chamber of the connector housing 1 (see FIG. 8), such bending of a wire should be avoided.

Figure 6:
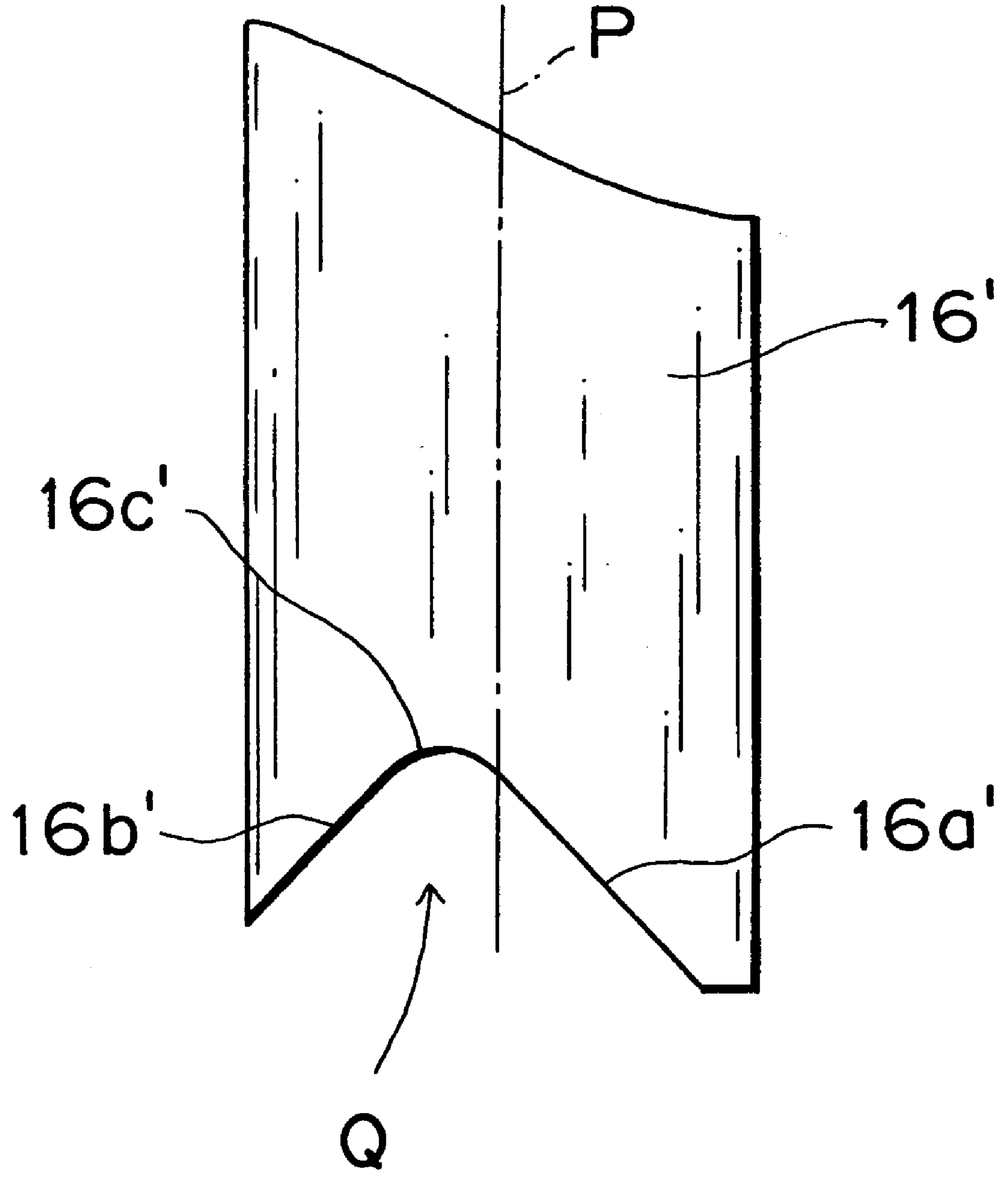
FIG. 6 is a front view of the wire holding member of another embodiment of the present invention.

FIG. 6 shows an improved wire holding member 16' with which wire bending after pressure welding can be avoided.

The wire holding member 16' is provided with a wire holding inclined large surface 16*a'* and a wire restricting inclined small surface 16*b'* at the bottom thereof. The inclined surfaces 16*a'* and 16*b'* form a reversed V shape that serves as an asymmetrical wire holding groove Q. The bottom of the groove Q deviates from the center line P, and is formed as a wire holding portion 16*c'* which has a round shape to accommodate the outer diameter of the wires 3 and 3'.

Figure 7A:
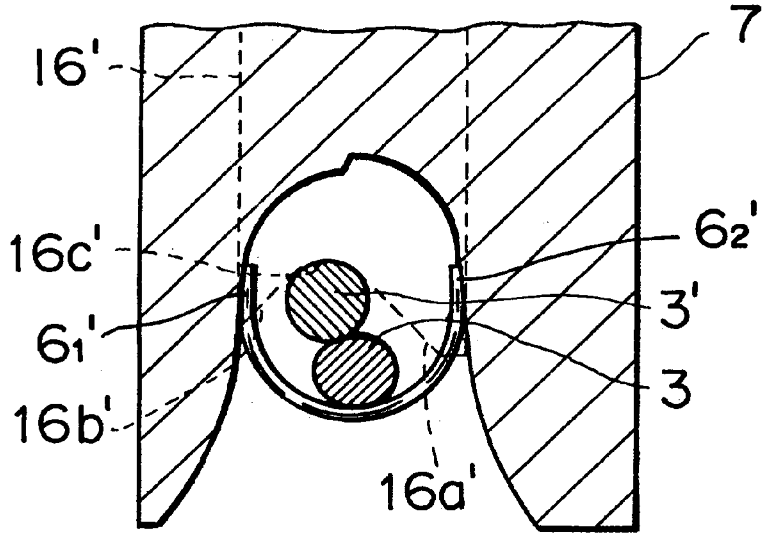
FIGS. 7A and 7B illustrate how the wire holding member of FIG. 6 works with the wires.
Figure 7B:
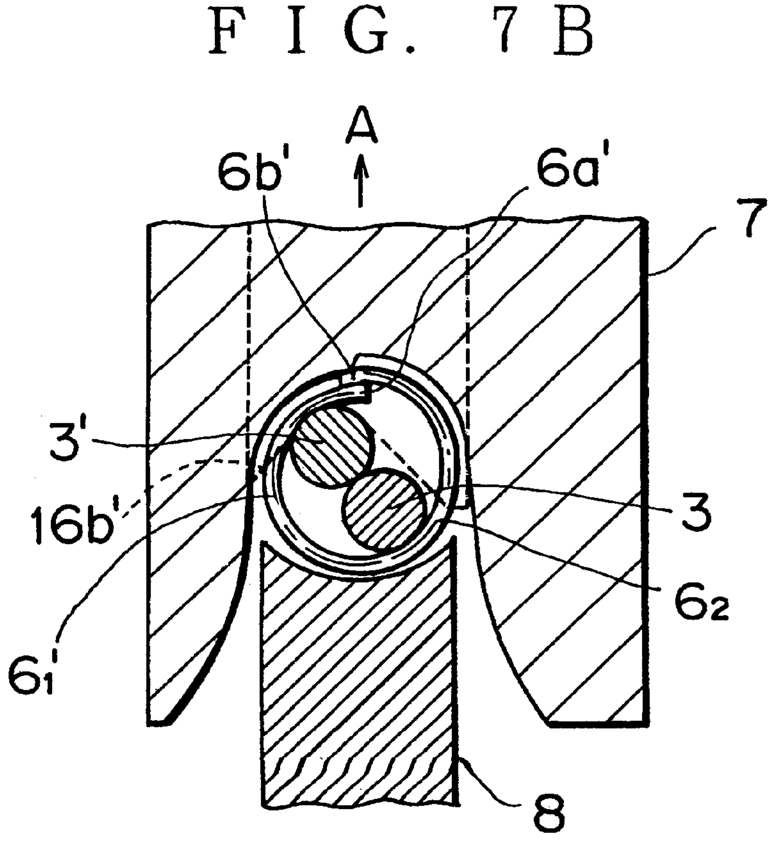

FIGS. 7A and 7B illustrates how the wire holding member 16' works with the wires.

Since the wire holding member 16' is provided with the wire holding inclined large surface 16*a'* as the wire holding member 16 does, the position of the pair of wires 3 and 3' is limited to the space between the pair of insulator barrels $6_1$' and $6_2$', as shown in FIGS. 3A to 3C.

The wire holding inclined surface 16*a'* and the wire restricting inclined surface 16*b'* of the wire holding member 16' integrally form the wire holding groove Q, so the position of the wires can be restricted more accurately. As shown in FIG. 7A, the wires 3 and 3' are pushed into the space between the insulator barrels $6_1$' and $6_2$' by the wire holding portion 16*c'* that is also the bottom of the wire holding groove Q. Thus, the wires 3 and 3' are secured as shown in FIG. 4A.

As the crimper 7 descends further, the edges 6*a'* and 6*b'* of the insulator barrels $6_1$' and $6_2$' are rounded as shown in FIG. 7B. Here, the wire restricting inclined surface 16*b'* serves as a stopper for the wire 3'. So, even if the force F acts on the wire 3', due to the wire holding inclined surface 16*a'*, wire bending can be avoided.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A terminal pressure welding method, comprising the steps of:

pushing a plurality of wires into a space between a pair of laterally spaced barrels by a wire holding member;

placing the wires in a mutually abutting position, one upon the other, with the uppermost wire abutting one of said barrels immediately below the edge thereof and providing an ingress allowance space adjacent the other barrel for allowing said edge of said one barrel to be urged during caulking below said other barrel; and thereafter, caulking the barrels by overlapping the other of the barrels on said one barrel by a crimper so that the barrels cover the wires.

2. A product made by the method of claim 1.

3. A terminal pressure welding device comprising:

a wire holding member for pushing wires into a space between a pair of barrels;

a crimper for caulking the barrels by overlapping one of the barrels on the other so that the barrels cover the wires; and said wire holding member having a wire holding inclined surface provided on the bottom edge thereof, with said wire holding inclined surface descending inclinedly from one of the barrels toward the other, and means for moving said wire holding member against said wires prior to caulking said barrels by said crimper.

4. A terminal pressure welding device comprising:

a wire holding member for pushing wires into a space between a pair of barrels prior to caulking said barrels;

said wire holding member having an asymmetrically reversed V-shaped wire holding groove provided on a bottom edge of the wire holding member, said wire holding groove including a longer wire-holding inclined surface which inclinedly descends from one of the barrels toward the other, and a wire-restricting inclined surface being shorter than said longer surface which inclinedly descends in the opposite direction of descent of the longer wire holding inclined surface; and a crimper for caulking the barrels by overlapping one of the barrels on the other so that the barrels cover the wires.

5. The terminal pressure welding device according to claim 4, wherein the wire-holding groove including the longer wire-holding inclined surface and the shorter wire-restricting inclined surface has a groove bottom of a round shape to accommodate the outer diameter of the wires which serves as a wire-holding portion of said wire-holding member.

* * * * *